(12) United States Patent
Mehl (10) Patent No.: US 6,559,405 B2
(45) Date of Patent: May 6, 2003

(54) POSITIONING DEVICE FOR WELDING ELECTRODE

(75) Inventor: Mark Edward Mehl, Centerville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/879,689

(22) Filed: Jun. 12, 2001

(65) Prior Publication Data

US 2002/0185480 A1 Dec. 12, 2002

(51) Int. Cl.[7] .................................................. B23K 9/10
(52) U.S. Cl. ................................ 219/60 A; 219/124.22; 219/125.11
(58) Field of Search ....................... 219/124.22, 130.01, 219/60 A, 125.11, 124.34

(56) References Cited

U.S. PATENT DOCUMENTS

| | | | | | |
|---|---|---|---|---|---|
| 2,030,689 A | * | 2/1936 | Dorrat | .................. | 219/125.11 |
| 2,855,679 A | | 10/1958 | Gibble | .......................... | 33/46 |
| 2,866,887 A | * | 12/1958 | Kumagai | ............... | 219/124.21 |
| 3,117,480 A | | 1/1964 | Peddinghaus | ................ | 83/520 |
| 3,130,633 A | | 4/1964 | Rantsch | ......................... | 88/24 |
| 3,448,280 A | * | 6/1969 | Blitchington, Jr. et al. | ..................... | 250/227.11 |
| 3,534,199 A | * | 10/1970 | Downey et al. | .......... | 219/60 R |
| 3,728,027 A | | 4/1973 | Watanabe | ..................... | 356/13 |
| 4,078,869 A | | 3/1978 | Honeycutt | ................... | 408/16 |
| 4,123,143 A | | 10/1978 | Yachin et al. | ............... | 350/171 |
| 4,491,719 A | * | 1/1985 | Corby, Jr. | .............. | 219/124.34 |
| 4,581,518 A | * | 4/1986 | Takahashi et al. | ..... | 219/130.01 |
| 4,599,506 A | * | 7/1986 | Burke et al. | ........... | 219/130.01 |
| 4,724,301 A | * | 2/1988 | Shibata et al. | ......... | 219/124.34 |
| 4,859,829 A | * | 8/1989 | Dufour | ................... | 219/124.34 |
| 5,570,187 A | * | 10/1996 | Nihei et al. | .................. | 356/376 |
| 5,837,966 A | * | 11/1998 | Timmons, Jr. | ......... | 219/124.34 |
| 6,156,991 A | * | 12/2000 | Lorincz | .................... | 219/60 A |

* cited by examiner

Primary Examiner—Tom Dunn
Assistant Examiner—Kevin P. Kerns
(74) Attorney, Agent, or Firm—W. Scott Andes; Hasse Guttag & Nesbitt LLC; Eric W. Guttag

(57) ABSTRACT

A positioning device for positioning a welding electrode near objects to be welded. A laser projects a light ray which is affixed to, and has a known spatial relationship with, the electrode. The laser is adjusted as to position, until the light ray strikes a target. At that time, the electrode stands in a corresponding position, which is the correct position for welding.

14 Claims, 10 Drawing Sheets

FIG 16

POSITIONING DEVICE FOR WELDING ELECTRODE

FIELD OF THE INVENTION

The invention concerns a device for positioning a welding electrode in an orbital tube-welding apparatus. Such apparatus are used to weld hollow objects to each other, such as a tube with a conical tube.

BACKGROUND OF THE INVENTION

Figures 1, 2:
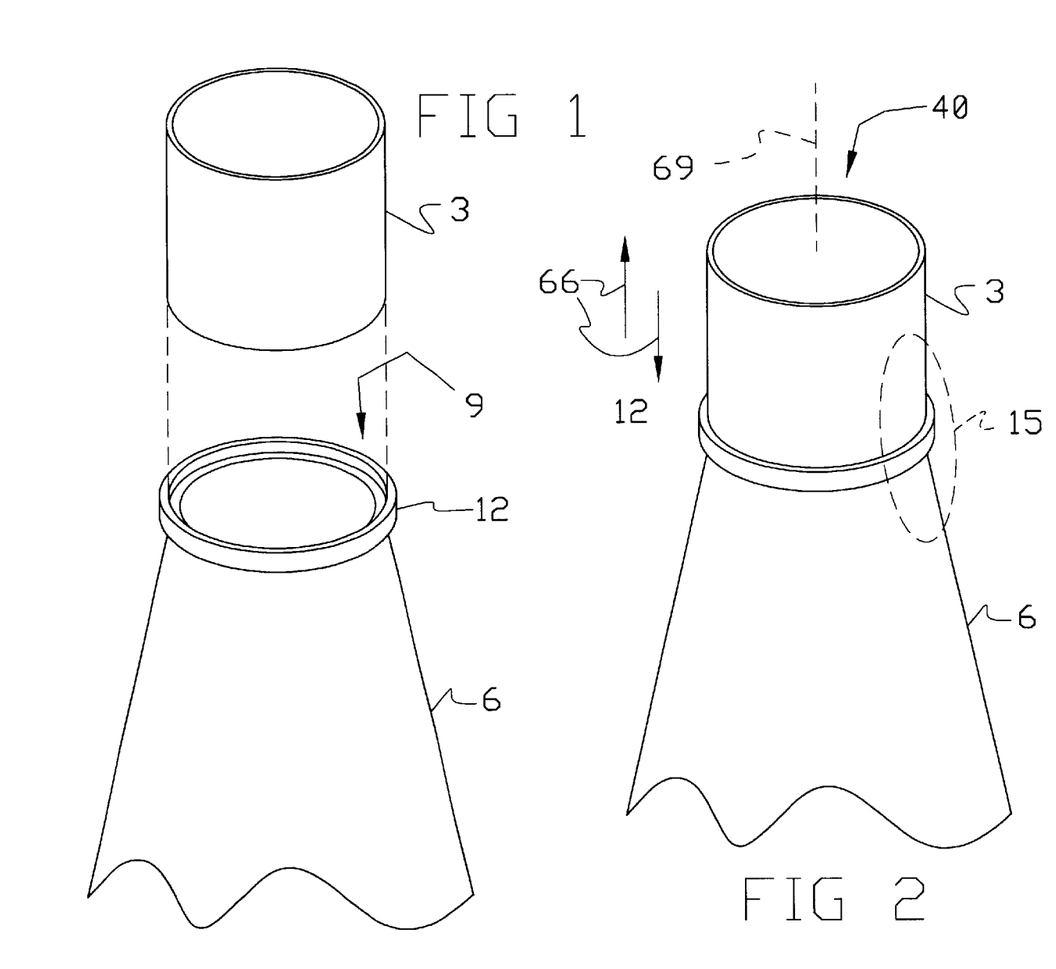
FIG. 1 illustrates two components 3 and 6, which are to be welded together.
FIG. 2 illustrates the components of FIG. 2, in assembled form.
Figure 3:
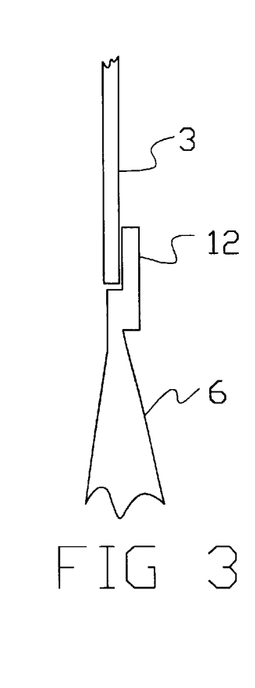
FIG. 3 is a cross-sectional view of region 15 in FIG. 2.

FIG. 1 illustrates a tube 3 which is to be welded to a conical structure 6, which is hollow, and will be termed conic 6 herein. The tube 3 fits into a recess 9, and is held concentric to the conic 6 by an annular flange 12. FIG. 2 shows the tube 3 placed in position for welding. Dashed ellipse 15 represents a region which is shown in cross-sectional view in FIG. 3. Tube 3 is shown, as are annular flange 12 and conic 6.

The Inventor has identified a difficulty which occurs in welding the structures of FIG. 2 together, and has advanced a solution.

SUMMARY OF THE INVENTION

In one form of the invention, a laser is affixed to a welding electrode, and projects a laser beam in a predetermined spatial relationship with the electrode. A human operator positions the laser beam on a target, which has a predetermined spatial relationship with a spot to be welded. The electrode thereby becomes positioned at a predetermined spatial position with respect to the spot.

DETAILED DESCRIPTION OF THE INVENTION

Figure 4:
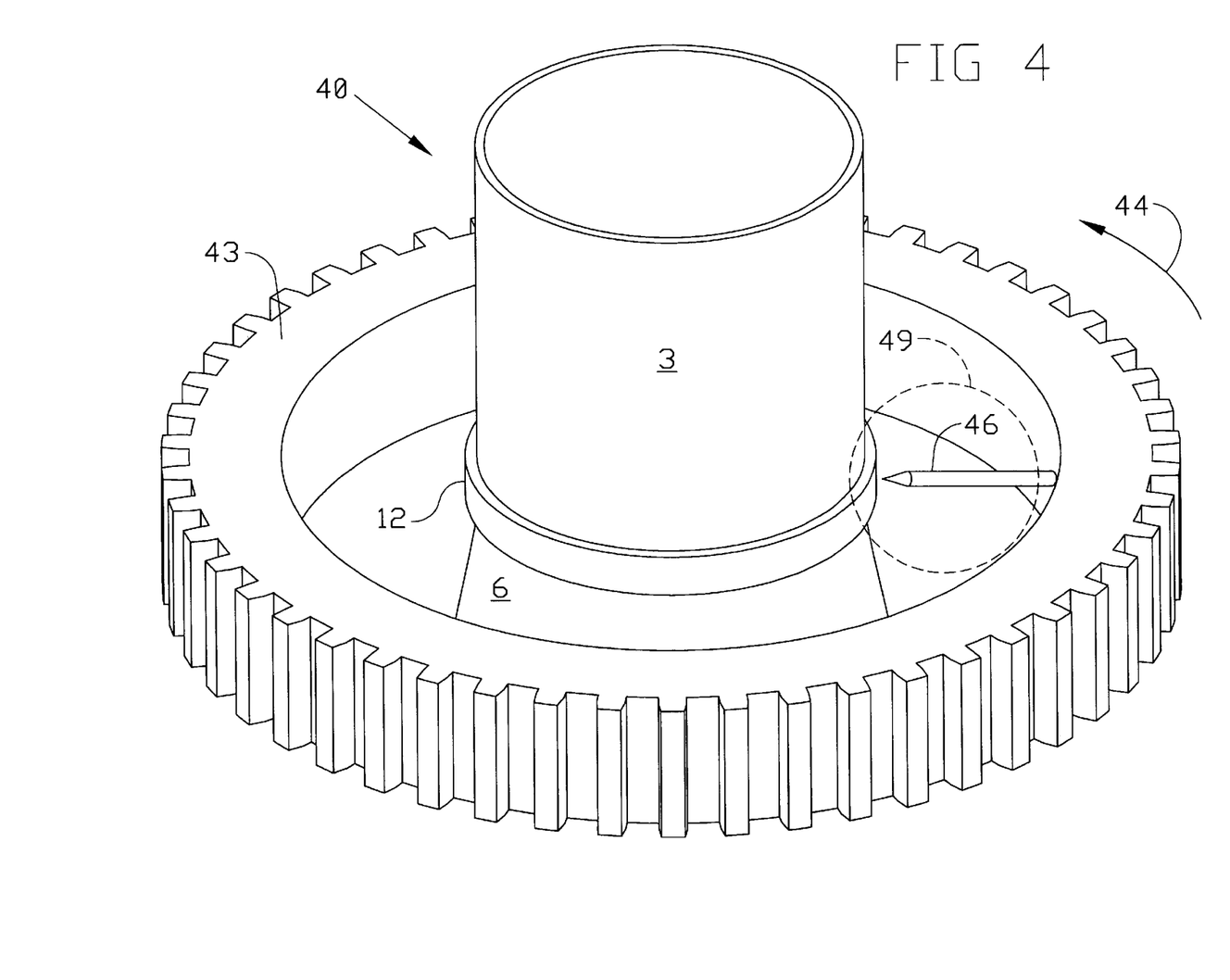
FIG. 4 is a simplified schematic of a tube-welding apparatus.
Figure 5:
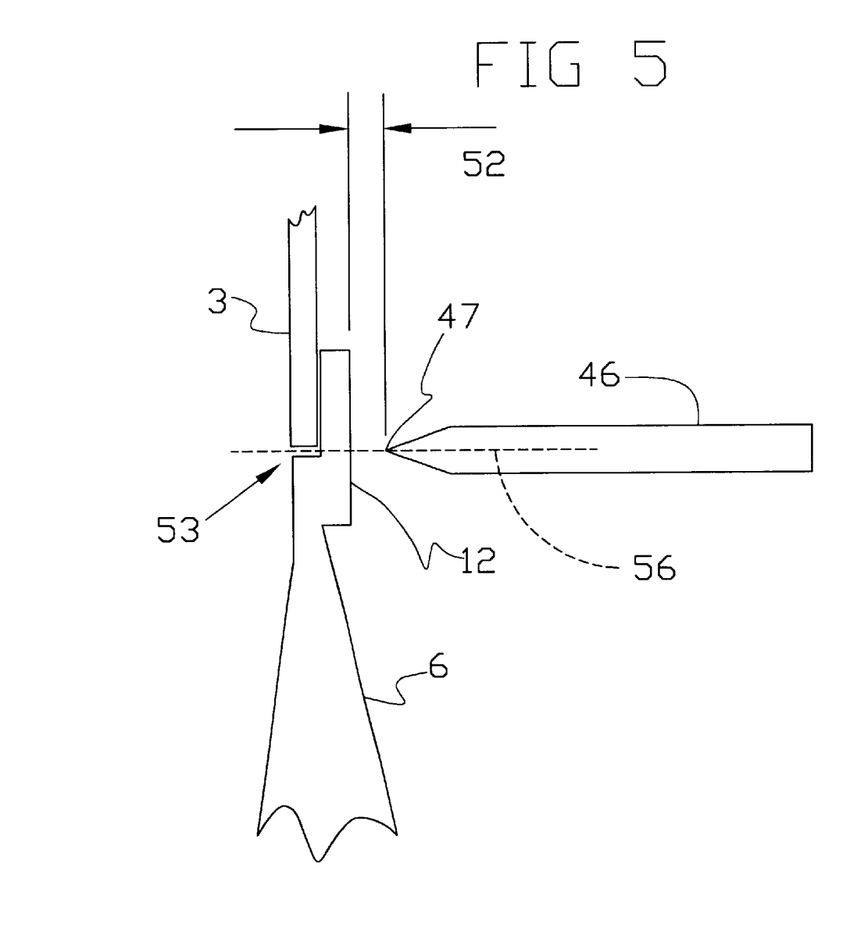
FIGS. 5 and 6 are cross-sectional views of region 49 in FIG. 4.

FIG. 4 shows the assembly 40 of FIG. 2, comprising tube 3 and conic 6. The assembly 40 is positioned within a ring gear 43. The ring gear 43 supports a tungsten welding electrode 46. FIG. 5 shows a cross-sectional view of region 49 in FIG. 4.

In FIG. 5, the electrode 46 is held at a standoff distance 52 from the flange 12. After the electrode 46 is properly positioned, an electrical arc, not shown, is struck, by applying a momentary high voltage between the electrode 46 and the flange 12. Next, after the arc is struck, a lower voltage is applied between the electrode 46 and the flange 12 which then maintains the arc, and the welding operation begins.

During welding, the ring gear 43 in FIG. 4 rotates as indicated by arrow 44, while the assembly 40 remains stationary. During welding, the flange 12 is held at a positive potential, and the electrode 46 is held at a negative potential.

It is required that the electrode 46 in FIG. 5 be positioned accurately. For example, in one application, the tip 47 of the electrode 46 must be positioned in the plane of the junction 53 between the tube 3 and flange 12. The plane includes the axis indicated by dashed line 56.

Figure 6:
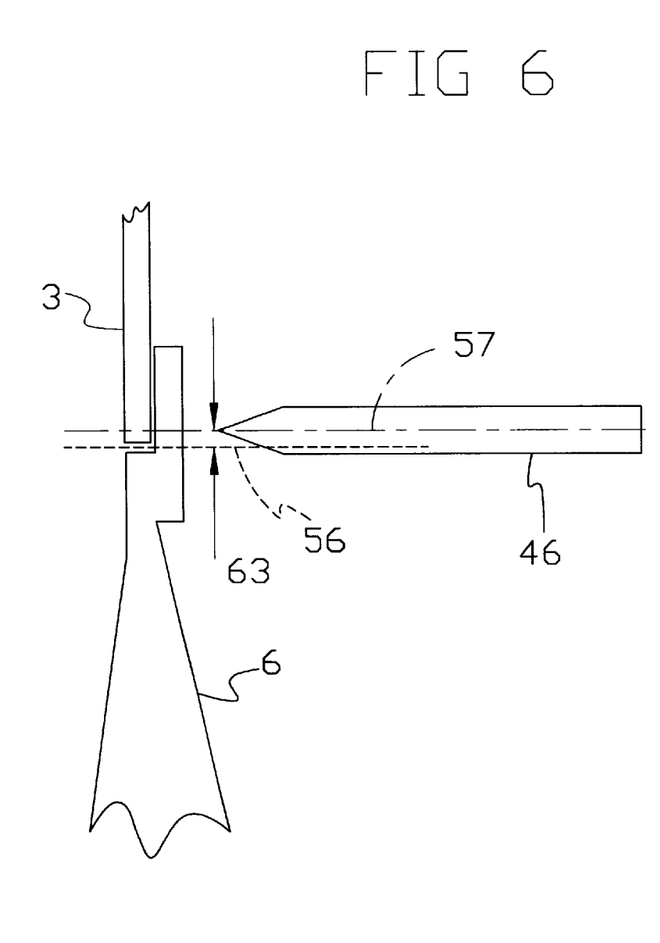

If the electrode 46 is displaced from the proper position, as indicated by displacement 63 in FIG. 6, wherein the axis 57 of the electrode 46 is displaced from axis plane 56, faulty welds can result. An axial displacement 63 as small as 0.015 inches, that is, 15 mils, is sufficient to prevent attainment of an optimal weld.

The term axial refers to movement in the direction of arrows 66 in FIG. 2, which are parallel to the axis 69 of the tube 3.

It is difficult to position the electrode 46 so that any displacement 63 is within allowed limits. A primary reason is that the human operator's eye 58 in FIG. 7 cannot be placed in plane 60, which contains axis 56 of FIG. 5, which coincides with junction 53. That is, the eye 58 in FIG. 7 cannot sight along line 61 because the ring gear 43 obscures the view, as indicated by the break in line 61.

Figure 7:
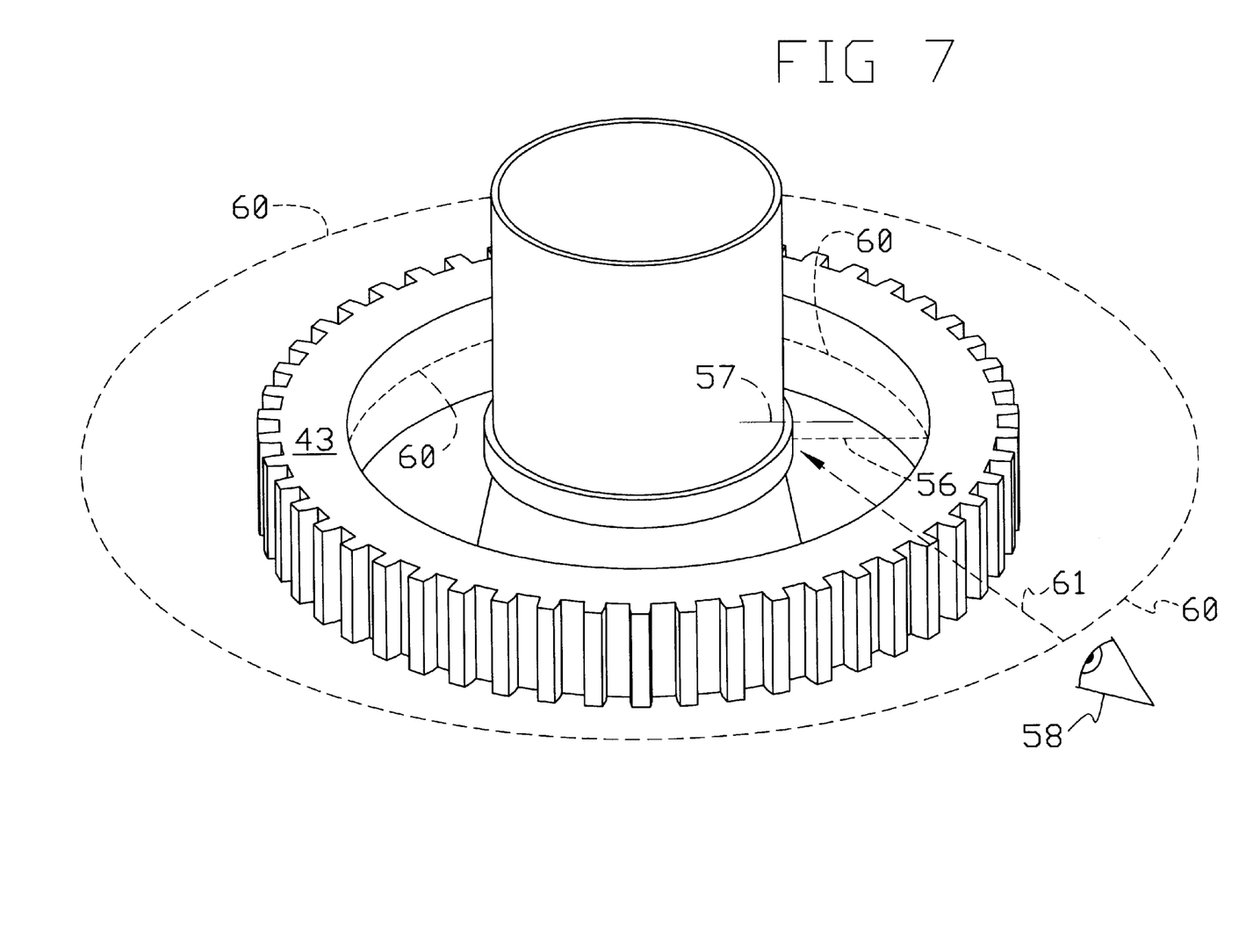
FIG. 7 illustrates a plane 60 into which the axis 57 of the electrode 46, not shown in FIG. 7, must be positioned.

Stated another way, if the operator could place the eye 58 in plane 60 in FIG. 7, the operator could perhaps determine whether axis 57 of the electrode 46, not shown, coincides with axis 56. However, ring gear 46 blocks the view of the operator. This overall problem will be explained in greater detail.

Figure 8:
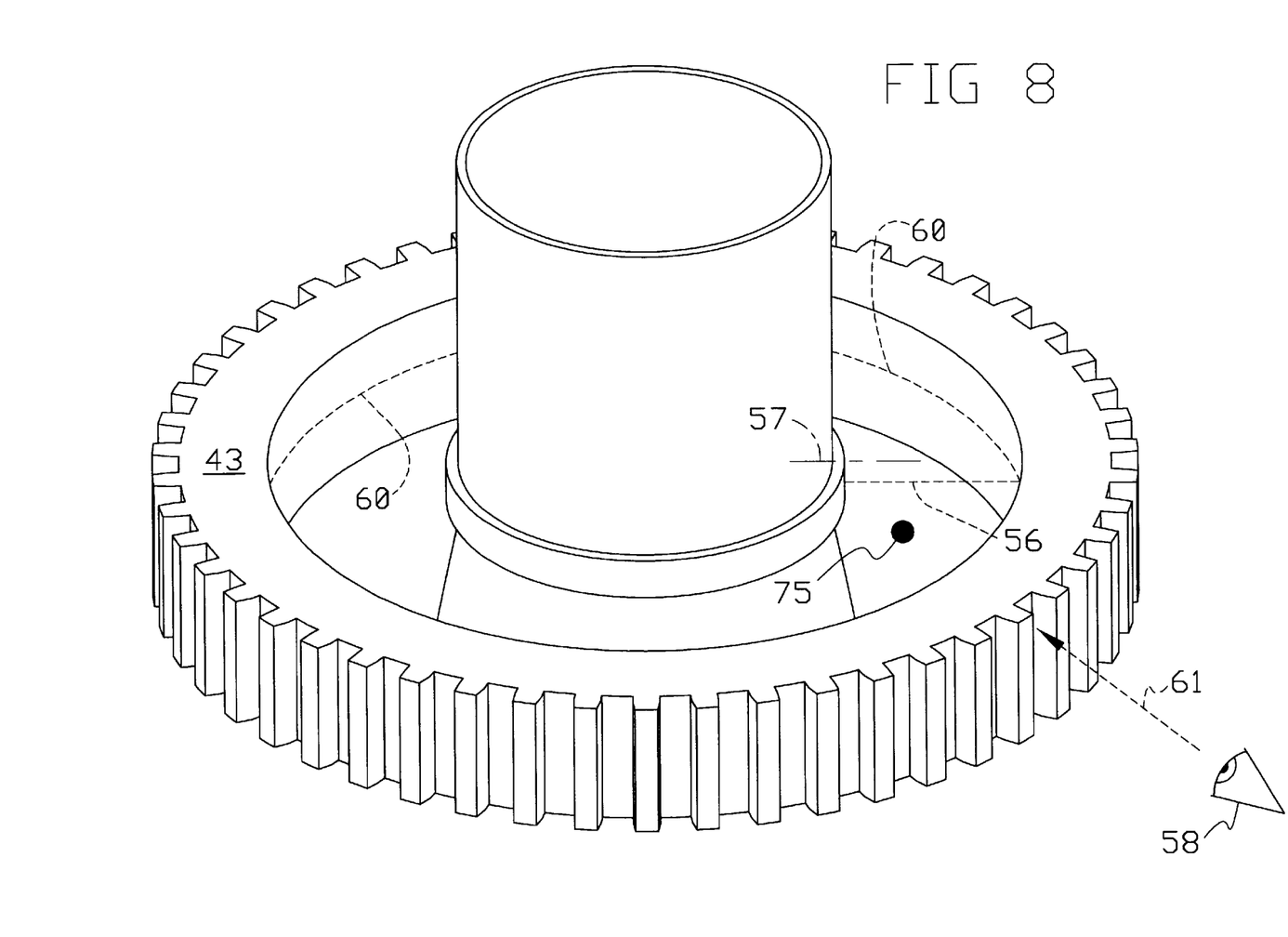
FIG. 8 illustrates how ring gear 43 blocks the view of eye 58.

The axis of the junction point 53 in FIG. 5, indicated by dashed line 56 in FIG. 8, is obscured from eye 58 by the ring gear 43. That is, dashed line 60, running along the inside of the ring gear 43, represents the plane that includes the axis indicated by dashed line 56. In FIG. 8, the eye 58 of a human operator cannot see whether the electrode axis 57 is aligned with that plane 60. Ring gear 43 prevents eye 58 from obtaining an edge-on view of plane 60.

If the ring gear 43 were sufficiently large, the head of the operator could be positioned at point 75 in FIG. 8. However, in the general case, the ring gear 43 is too small to allow such positioning.

A second reason for the difficulty in positioning electrode 46 is that, even if a human operator could gain access to an edge-on view of plane 60 in FIG. 8, that view does not necessarily solve the problem. One reason is that not all operators are sufficiently skilled to position the electrode 46 within the required 15 mils of a target position. For example, assume that the target position is represented by mark 77 in FIG. 9, which is scribed on the flange 12. The operator is required to position the point of the electrode 46, not shown, within circle 79, which is 15 mils in radius.

Figures 9, 10, 11:
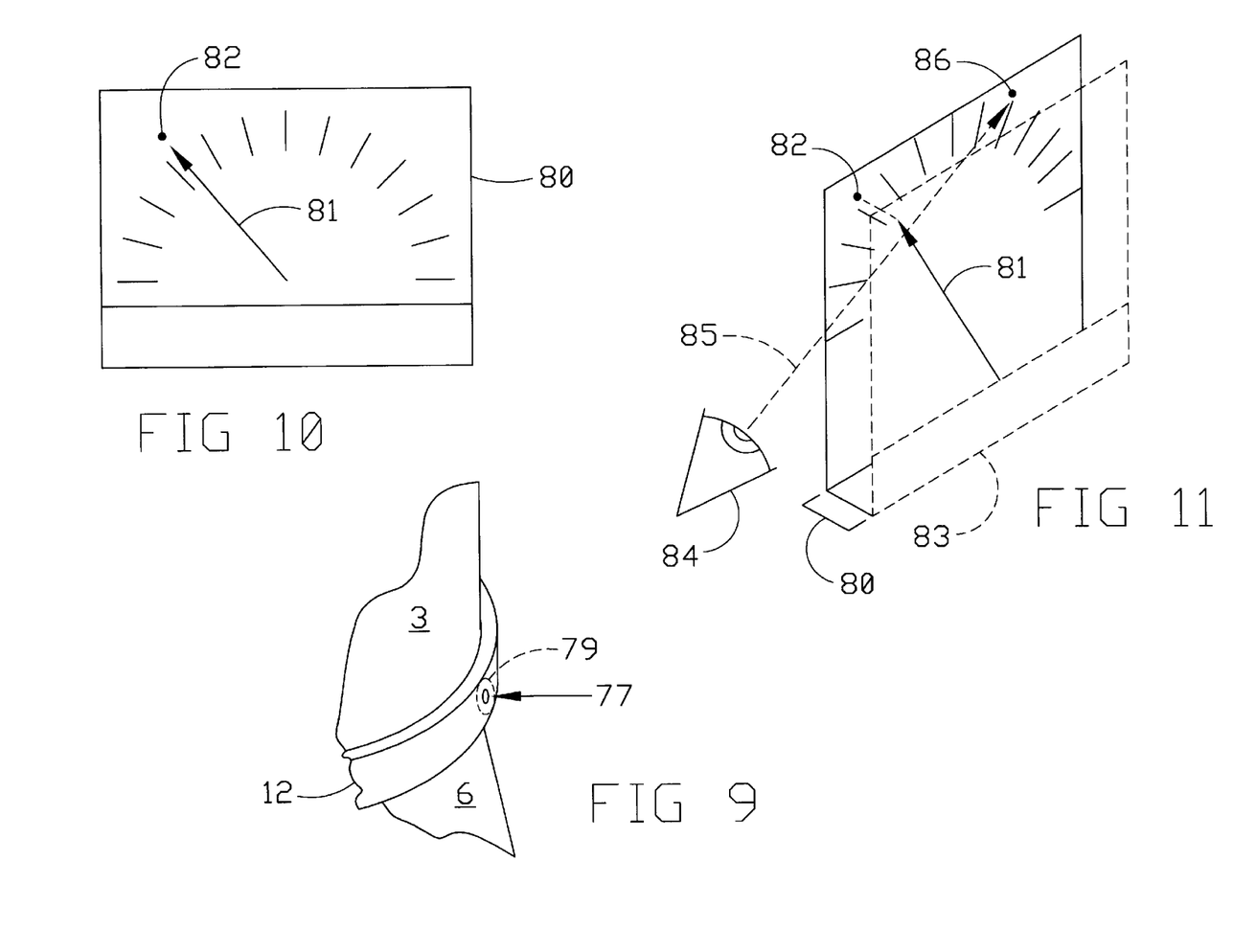
FIG. 9 illustrates a circle 79, which indicates an allowable margin-of-error in positioning an electrode, not shown, at target 77.
FIGS. 10 and 11 illustrate how parallax error occurs.

However, circle 79 is not drawn to scale. A circle of 15 mil radius is extremely small: a human hair is about 3 to 5 mils in diameter, so that circle 79 has a diameter equal to the thickness of about six human hairs. Stated another way, circle 79 is much smaller than a pinhead, and is closer in diameter to the diameter of the shaft of the pin, rather than the pinhead.

Only a skilled operator can visually position the tip 47 of the electrode 46 in FIG. 5 within circle 79 in FIG. 9.

A third reason why positioning the electrode 46 is difficult is that, even if an operator is sufficiently skilled to visually position the electrode 46, manufacturing practicalities present an additional obstacle. The additional obstacle is caused by the fact that the tip 47 of the electrode 46 in FIG. 5 is not positioned adjacent mark 77 in FIG. 9. Instead, the standoff distance 52 in FIG. 5 is maintained during the positioning process. This standoff distance generally lies in the range of 30 to 80 mils.

Under this requirement of maintaining the standoff distance 52, parallax error creates problems for the operator. Parallax error is well known, and refers to the type of error which occurs when reading a needle on a volt meter. An accurate reading is best obtained when the reader's eye is directly above the needle, and looking perpendicular to the marks on a card beneath the needle. FIGS. 10 and 11 provide examples illustrating parallax error.

FIG. 10 is the view seen by a person whose eye is directly perpendicular to the meter 80. The needle 81 is seen as indicating point 82. In contrast, FIG. 11 illustrates the eye 84 of a person viewing needle 81 from the side, and sighting along line 85. The needle 81, which lies in plane 83, appears to indicate point 86. But in fact, the needle 81 indicates point 82, as above.

Figures 12, 13, 14:
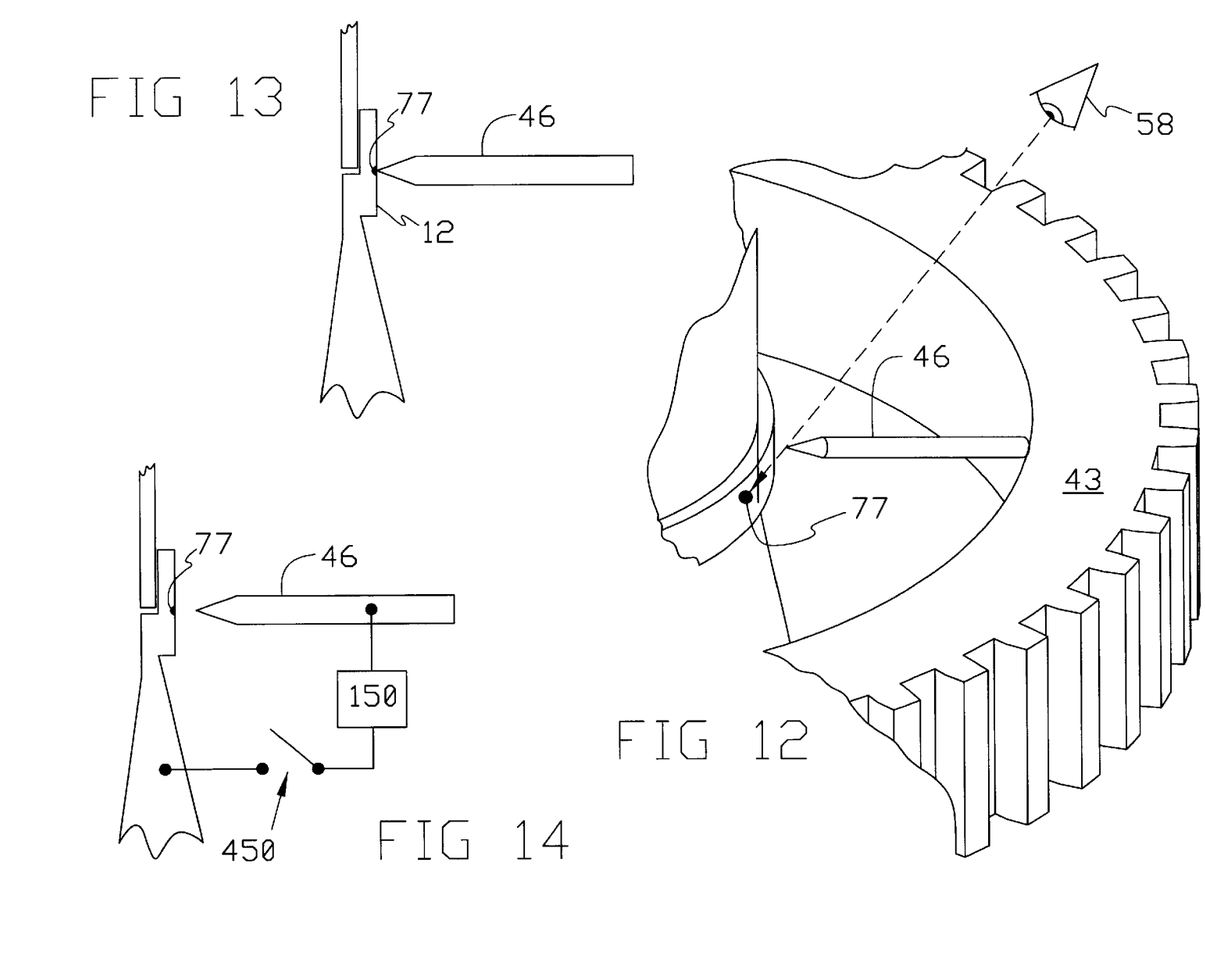
FIG. 12 illustrates parallax error in the device of FIG. 4.
FIGS. 13 and 14 illustrate a process of bringing electrode 46 into contact with target 77, and then creating a standoff distance between electrode 46 and the target 77.

A similar type of parallax error occurs when the eye 58 of the operator in FIG. 12 attempts to align the electrode 46 with mark 77.

It may be thought that the electrode 46 could be brought into contact with the flange 12, as in FIG. 13, to assist the operator in positioning the point of the electrode 46 against the mark 77. Then, the electrode 46 would be withdrawn to the position shown in FIG. 14. However, in practice, this is not done. The reason is that such a procedure would require that the standoff distance 52 in FIG. 5 be re-established, which is a time-consuming procedure.

Therefore, (1) the electrode must be positioned at an accurate axial position, (2) the ring gear 43 blocks a direct view of the tip of the electrode and introduces parallax error, (3) the parallax error is worsened by the fact that the tip of the electrode 46 is not adjacent flange 12, and (4) even if an operator had a direct view, and the tip 47 were adjacent flange 12, the tip 47 must be positioned within a very small distance from a target point. These factors make positioning electrode 46 difficult, or at least time-consuming.

Figures 15, 17, 18:
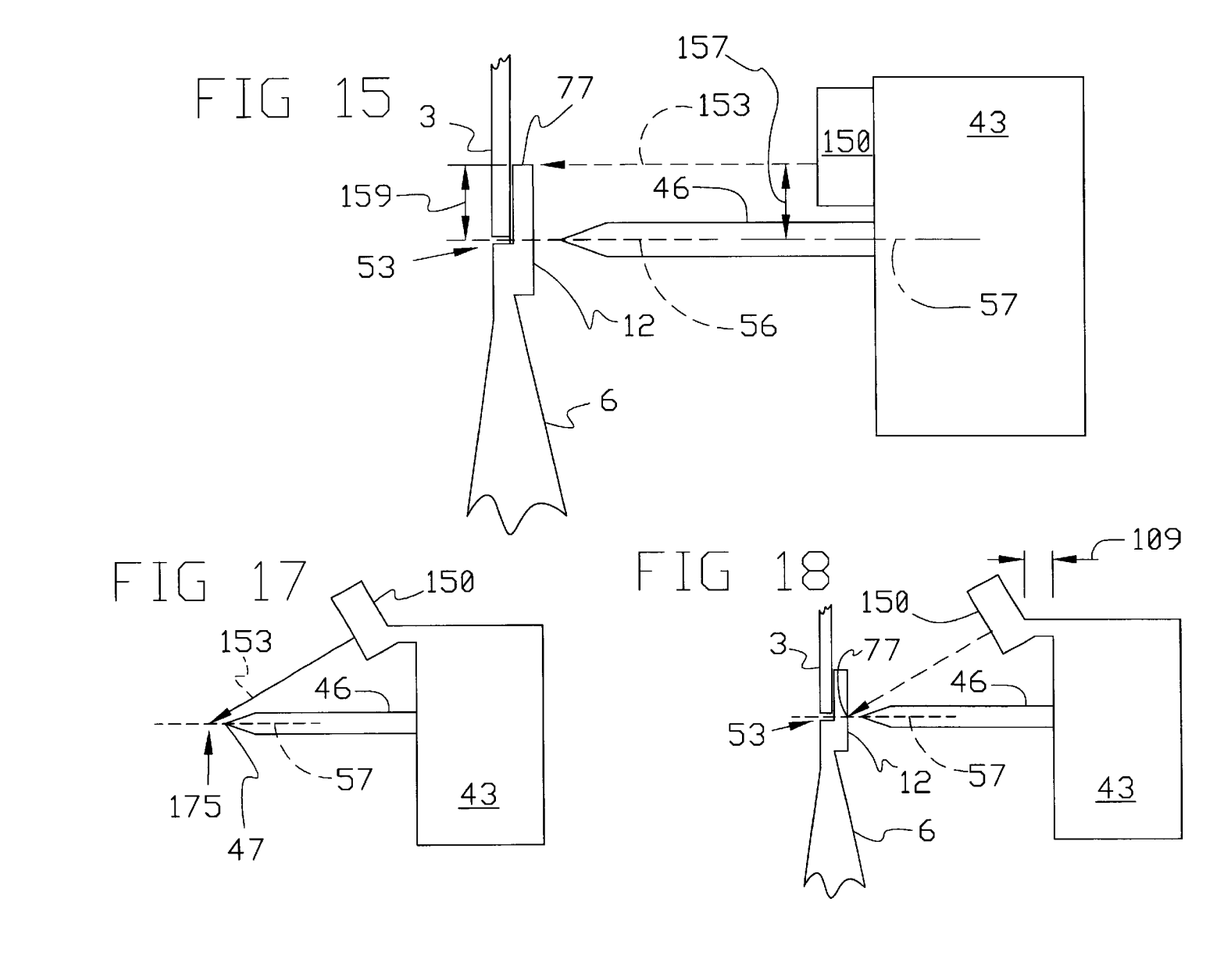
FIGS. 15 and 16 illustrate two forms of the invention.
FIGS. 17 and 18 illustrate alternate embodiments of the invention.

The invention mitigates many of these difficulties. FIG. 15 illustrates one form of the invention. A laser 150 is affixed to the ring gear 43, and shines a ray 153 onto the flange 12. As shown in FIG. 15, the ray is displaced from the axis 57 of the electrode 46 by a distance 157. Distance 157 equals the height 159 of the edge 155 of the flange 12 above the junction point 53. The laser 150 is fixed in position with respect to the electrode 46, and ray 153 is fixed with respect to the laser 150. Thus, when the ray 153 is positioned so that it produces a spot on the edge 155 of flange 12, the axis 57 of the electrode 46 will coincide with the axis indicated by dashed line 56, as required. This positioning of ray 153 is achieved by moving the ring gear 43 up and down in FIG. 15, with respect to the assembly 40 in FIG. 15, as known in the art.

Ray 153 is parallel with axis 57 of the electrode 46, and is perpendicular to the axis of rotation of the ring gear 43 in FIG. 4, which coincides with axis 69 of FIG. 2.

Of course, edge 155 need not be used, and the system can be arranged so that ray 153 is required to shine on any suitable target, such as mark 77, described in other Figures.

Figure 16:
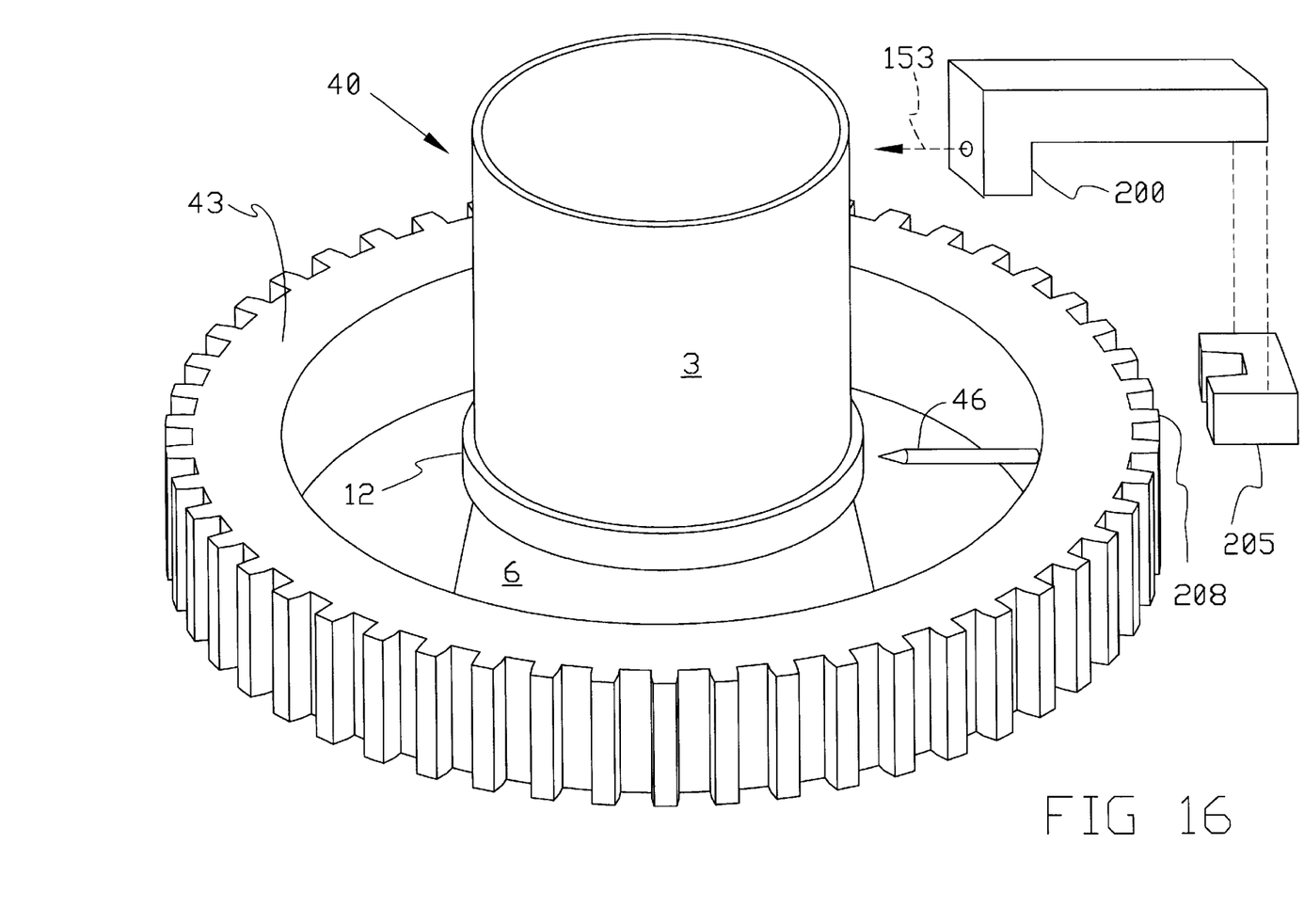

The laser need not be fixed to the ring gear 43. FIG. 16 shows a removable laser 200, projecting ray 153. One or more indexing fingers 205 mate with teeth 208 of the ring gear 43. Alternately, pins, not shown, on the laser 200 can mate with holes, not shown, in the ring gear 43, to position the laser 200 in the desired position. The ring gear 43 is moved with respect to assembly 40, as described above, to position the laser at the proper position.

Ray 153 need not be parallel with the axis of the electrode 46. For example, as shown in FIG. 17, the laser 150 may be positioned so that ray 153 intersects the axis 57 of the electrode 46. The distance between the intersection point 175 and the tip 47 coincides with the standoff distance. It is assumed that the electrode can be positioned on a radial line of the tube 3. Therefore, when the laser-150/electrode-46 assembly is brought toward the flange 12, the assembly is correctly positioned when the laser dot coincides with mark 77, as shown in FIG. 18.

The intersection principle can be applied to the removable laser of FIG. 16.

The standoff distance can be adjusted by adjusting distance 109 in FIG. 18, as by adjusting a screw, not shown.

The removable laser 200 of FIG. 16 is removable in a specific sense. In general, it could be said that anything is removable, because that thing can be unbolted, or cut, from its mounting. However, the laser of FIG. 16 is held in place by the operator's hand, not shown; gravity; a hand-operated wing nut, or the like. The laser is indexed in position by the teeth 205, or the pins described above, or the like. Preferably, no tools are required by the operator to install, or remove, the laser. Thus, one definition of removable is that the laser can be properly positioned without the use of tools, and that, if fasteners are involved, the unaided human hand is sufficient to attain removal.

Figure 19:
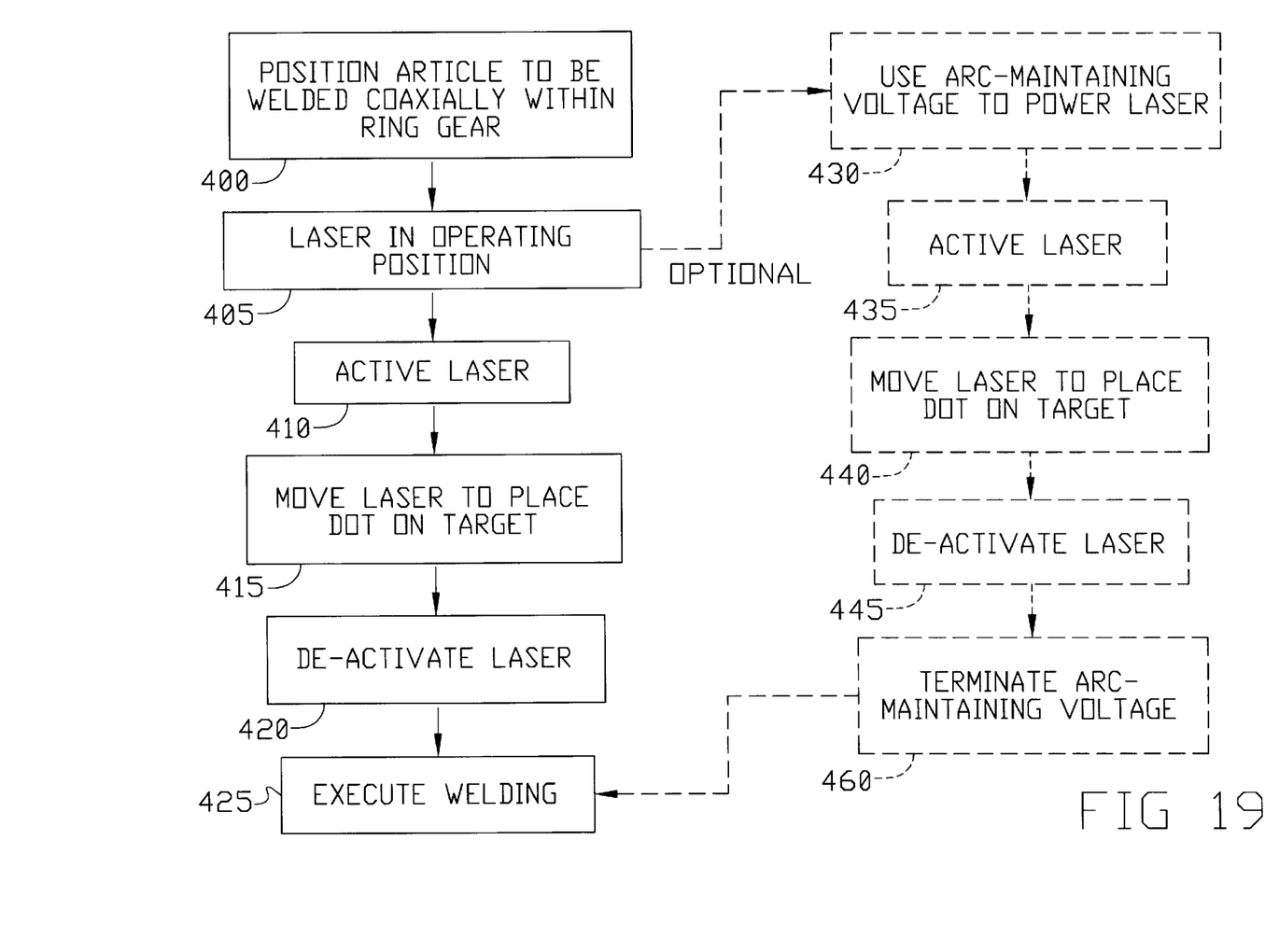
FIG. 19 is a flow chart illustrating processes undertaken by one form of the invention.

One form of the invention comprises a method of positioning electrode 46. FIG. 19 is a flow chart of steps undertaken in the positioning process. In block 400, a cylindrical assembly, such as that of FIG. 2, is positioned coaxially within a tube welding apparatus. In block 405, a laser is positioned, or maintained in a position, which bears a predetermined relationship with a welding electrode. FIGS. 15 and 17 illustrate two such relationships.

In block 410 in FIG. 19, the laser is activated, thereby producing a ray of light. In block 415, the ray is moved so that it projects a laser dot onto a known target. FIG. 15 provides an example of a target, namely, edge 155 of the flange 12.

Since the electrode 46 lies in a fixed physical relationship with the laser, placing the laser dot onto the target causes the tip of the electrode to assume its proper position.

Block 420 indicates that the laser is deactivated, and block 425 indicates that welding begins. One reason for the de-activation is that the welding arc (not shown) is an extremely intense source of electromagnetic radiation, including radiation in the visible spectrum. Such radiation may interfere with the lasing action of the laser, if not protected, as by a metal shield.

Another reason for de-activating the laser is that, as explained above, an initial high voltage pulse is applied to initiate the welding arc. In one embodiment of the invention, the laser is powered by the voltage difference between the electrode 46 and the conic 6. FIG. 14 is a simplified schematic of the situation: a switch 450 connects laser 150 to the negative electrode 46 and the positive conic 6.

In this embodiment, prior to actual welding, the normal welding voltage, of about 10 volts, is applied between the conic 6 and the electrode 46. However, no arc has been struck at this time. This voltage only serves to power the laser 150, which is used to position the electrode 46. After positioning the electrode, the laser is disconnected, as by opening switch 450 in FIG. 14, and the welding operation begins.

This embodiment is represented by the optional path in FIG. 19 leading to block 430, which indicates that the arc-maintaining voltage is used to power the laser. That is, block 430 indicates that the switch 450 in FIG. 14 is closed, in order to power the laser 150. Blocks 435, 440, and 445 in FIG. 19 correspond to blocks 410, 415, and 420, respectively.

Block 460 indicates that the arc-maintaining voltage is terminated, as by opening switch 450 in FIG. 14. In block 425, welding begins, wherein a high-voltage pulse is used to initiate the arc, and is then replaced by the arc-maintaining voltage.

Miniature lasers are commercially available, such as those used as gun sights for pistols and rifles. Rotary tube welding apparatus are also commercially available, such as those offered by Liburdi Dimetrics, in North Carolina, USA.

The preceding discussion has been framed in terms of an orbital welding system. However, this system should be considered exemplary only. The invention can be extended to most, if not all types of welding, wherein (1) an electrode, (2) a welding rod, or (3) a torch must be positioned accurately. Specifically included are gas tungsten arc welding, arc welding generally, and any welding process, including groove welding, fillet welding, and lap joint welding.

In addition, the weld joint need not be circumferential or curved, as occurs in orbital welding. The invention is also applicable to welding of flat plates, which can be viewed as orbital welding at an extremely large diameter.

Therefore, the invention presents an approach to positioning a probe involved in a welding operation. The particular use to which the probe is applied after the positioning, such as causing it to orbit about a tube, can be viewed as an ancillary matter.

Numerous substitutions and modifications can be undertaken without departing from the true spirit and scope of the invention. What is desired to be secured by Letters Patent is the invention as defined in the following claims. For example, lasers were described herein. Collimated light may be used instead.

What is claimed is:

1. Orbital tube-welding apparatus, comprising:
   a. a welding electrode;
   b. an optical projector which projects a light ray; and
   c. a movable support which
      i) connects the electrode to the projector, and
      ii) places the welding electrode in a predetermined spatial position relative to a target when the position of the support causes the light ray to illuminate the target such that the electrode is positioned at a predetermined spatial position with respect to a spot to be welded.

2. Apparatus according to claim 1, wherein the optical projector comprises a laser.

3. A method of positioning a welding electrode in an orbital tube-welding apparatus, the electrode arranged in a predetermined spatial position with respect to a spot to be welded, comprising:
   a. positioning a light ray in a predetermined spatial relationship with the electrode; and
   b. moving both the electrode and the light ray in the predetermined spatial relationship until the light ray illuminates a target having a predetermined spatial relationship to the spot to be welded such that the electrode is positioned at a predetermined spatial position with respect to the spot to be welded.

4. Apparatus, comprising:
   a. a ring gear which
      i) supports a welding electrode, and
      ii) rotates the electrode about an axis of revolution;
   b. a support, connected to the ring gear, which supports a laser which projects a light ray which indicates a predetermined spatial position of the electrode relative to a target when the light ray illuminates the target.

5. Apparatus according to claim 4, wherein the support is removable from the ring gear without tools.

6. Apparatus according to claim 4, wherein the light ray is perpendicular to the axis.

7. A method, comprising:
   a) maintaining a welder which
      i) applies a high voltage to an electrode in order to strike an arc, and then
      ii) replaces the high voltage with a lower voltage;
   b) prior to striking an arc,
      i) powering a laser with the lower voltage,
      ii) using the laser to position the electrode, and
      iii) after positioning is accomplished, terminating voltage to the laser; and
   c) striking the arc using the high voltage.

8. Method according to claim 7, wherein the welder comprises an apparatus which rotates the electrode about an axis during welding.

9. Method according to claim 8, wherein the laser projects a ray perpendicular to the axis.

10. A method of positioning a welding electrode comprising:
    a. prior to welding, projecting a light ray along a path having
       i) a predetermined fixed relationship with the electrode, and
       ii) an intersection point defined therein;
    b. moving the light ray and the electrode until the intersection point meets a target;
    c. terminating the light ray; and
    d. striking a welding arc.

11. Apparatus, comprising:
    a. a welding electrode;
    b. an optical projector which projects a light ray;
    c. a movable support which
       i) connects the electrode to the projector, and
       ii) places the welding electrode in a predetermined spatial position relative to a target when the position of the support causes the light ray to illuminate the target,
    d. means for obtaining electrical power for the optical projector from the potential difference between the electrode and a part to be welded; and
    e. means for disconnecting the electrical power from the optical projector when the part is being welded by the electrode.

12. A method of positioning a welding electrode, comprising:
   a. positioning a light ray in a predetermined spatial relationship with the electrode;
   b. moving both the electrode and the light ray until the light ray illuminates a target;
   c. terminating the light ray after the target is illuminated; and
   d. initiating welding.

13. A method of positioning a welding electrode, comprising:
   a. positioning a light ray in a predetermined spatial relationship with the electrode;
   b. moving both the electrode and the light ray in the predetermined spatial relationship until the light ray illuminates a target to position the electrode; and
   c. obtaining electrical power for producing the light ray from an electrical circuit which includes the electrode and disconnecting the electrical power prior to welding to terminate the light ray.

14. A method of positioning a welding electrode, comprising:
   a. positioning a light ray in a predetermined spatial relationship with the electrode;
   b. moving both the electrode and the light ray in the predetermined spatial relationship until the light ray illuminates a target to position the electrode; and
   c. obtaining electrical power for producing the light ray from a power supply which provides current for the welding and disconnecting the electrical power prior to welding to terminate the light ray.

* * * * *